Sept. 18, 1934.  B. T. PHILLIPS  1,974,194
FOOD COMMINUTING UTENSIL
Filed March 11, 1933  3 Sheets-Sheet 1
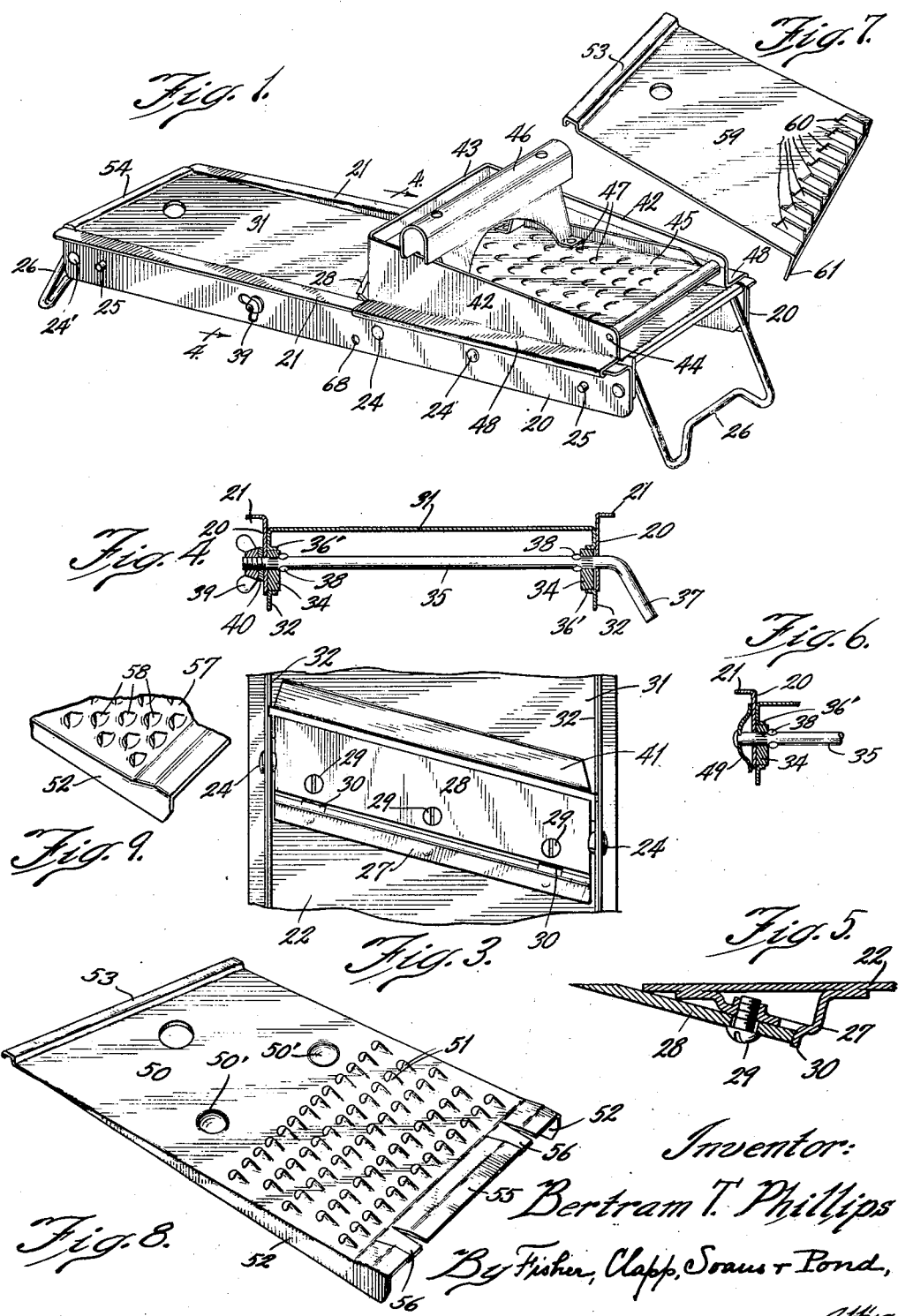

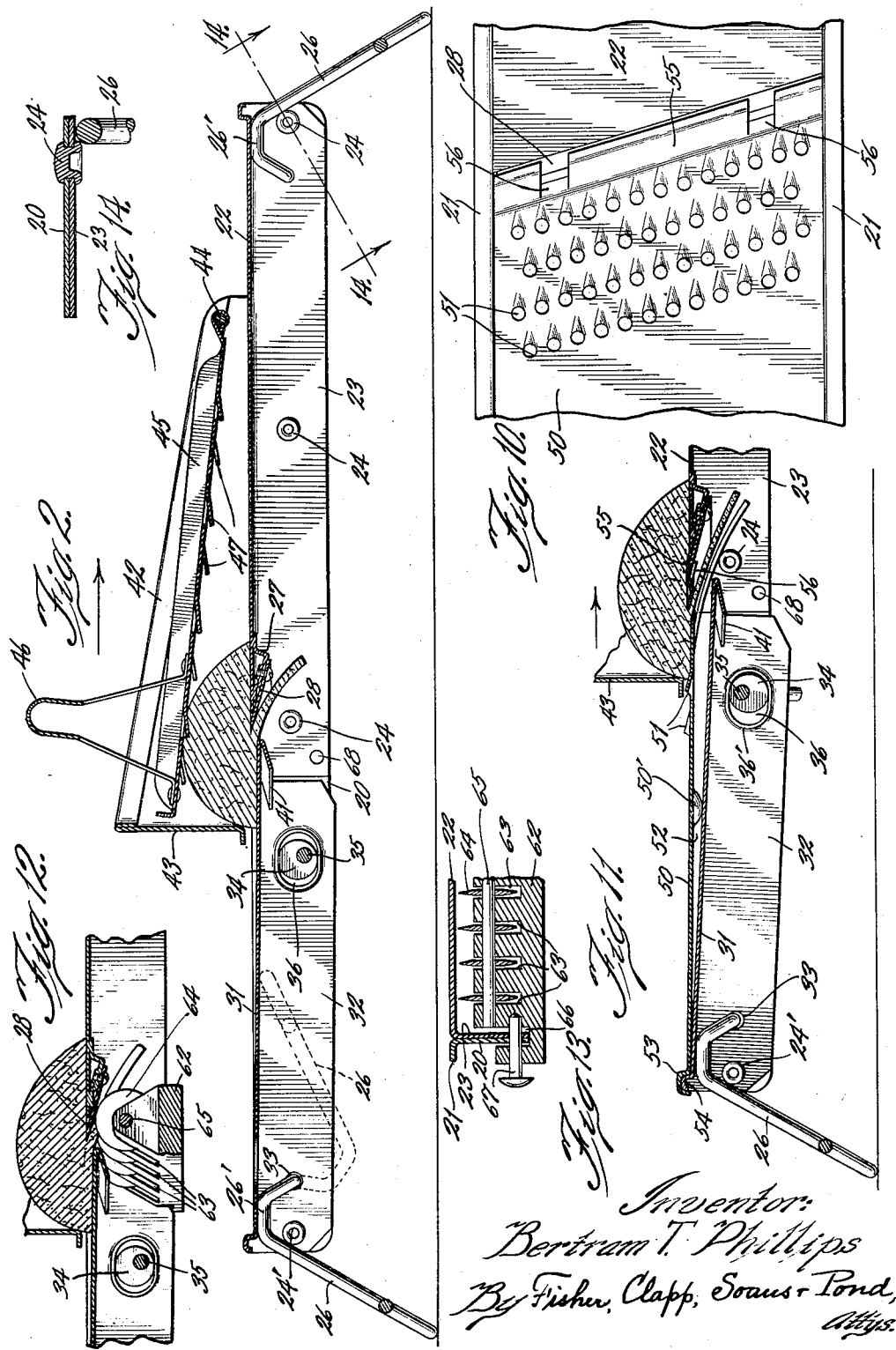

Sept. 18, 1934. B. T. PHILLIPS 1,974,194
FOOD COMMINUTING UTENSIL
Filed March 11, 1933 3 Sheets-Sheet 3
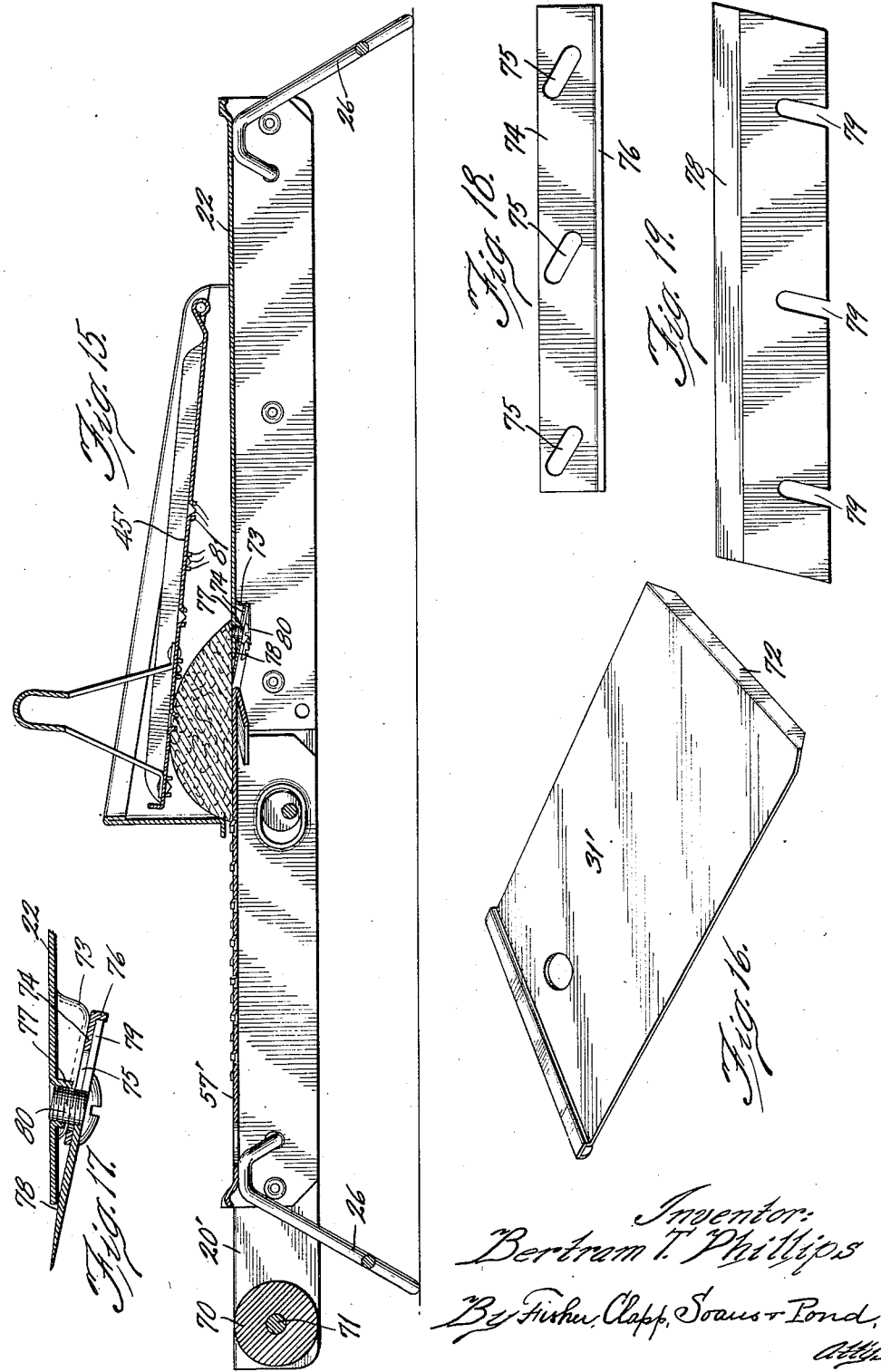

Patented Sept. 18, 1934

1,974,194

UNITED STATES PATENT OFFICE 1,974,194

FOOD COMMINUTING UTENSIL

Bertram T. Phillips, Elkhart, Ind., assignor to Carl Edward, Chicago, Ill.

Application March 11, 1933, Serial No. 660,338

11 Claims. (Cl. 146—168)

This invention pertains to devices for comminuting vegetables, fruits, and other articles of food, being designed more especially for cutting potatoes into various forms in which they are subsequently cooked, but also capable of cutting, shredding and grating not only potatoes but many other vegetables, fruits and other articles of food as well.

The article of my present invention is based on a broadly old and known principle of a frame or support having mounted in the upper surface thereof a cutter blade, a bottomless food carrier reciprocable over said frame, and a follower in said carrier for pressing the article to be sliced or otherwise cut onto the surface in which the blade is mounted.

One object of the present invention has been to provide a food comminuting utensil of this character capable, through adjustment of parts and the use of accessories, of cutting vegetables, fruits, etc., into a large variety of forms and sizes. Another object has been to simplify and cheapen the cost of such devices without any impairment of their efficiency. Still another object has been to provide a utensil of this character that shall be safe to operate and may be easily cleaned. And a still further object has been to provide a food comminuting utensil readily capable of receiving accessory devices for varying the character and sizes of the pieces cut, without requiring interchange or displacement of parts of the machine itself.

Still other objects and advantages of the invention will be apparent to persons familiar with this class of utensils, as the same becomes better understood by reference to the following detailed description, taken in connection with the accompanying drawings wherein I have illustrated one practical embodiment of the invention, and in which—

Fig. 1 is a perspective elevation of the device as adapted to effect the slicing of potatoes, and other articles.

Fig. 2 is a longitudinal vertical section of the same.

Fig. 3 is a fragmentary bottom plan view illustrating one form of cutter blade and mounting therefor.

Fig. 4 is a transverse vertical section on the line 4—4 of Fig. 1, showing the height adjusting device of a pivoted support.

Fig. 5 is an enlarged detail view in vertical section through the cutter blade and mounting shown in Fig. 3.

Fig. 6 is a sectional detail view illustrating a substitute for the cam locking device appearing at the left of Fig. 4.

Fig. 7 is a perspective view of an accessory plate designed to cooperate with the slicing blade in cutting what are known as "French fried" strips.

Fig. 8 is a perspective view of another accessory plate designed for shredding the articles into small strips, such as "shoe string" or "julienne" potatoes.

Fig. 9 is a fragmentary perspective view of still another accessory plate that is structurally similar to the shredder plate shown in Fig. 8, but is designed to function as a grater.

Fig. 10 is an enlarged fragmentary top plan view of the forward portion of the shredder plate shown in Fig. 8, shown in place on the machine.

Fig. 11 is a longitudinal vertical section illustrating the application of the shredder plate of Figs. 8 and 10 to the machine.

Fig. 12 is a fragmentary view in vertical section, illustrating another accessory usable in lieu of the plate shown in Fig. 7 for cutting into strips the slices cut by the slicing blade.

Fig. 13 is a fragmentary longitudinal vertical section through the strip-cutting accessory shown in Fig. 12.

Fig. 14 is a sectional detail view on the line 14—14 of Fig. 2, illustrating a device for yieldably locking the foldable legs of the frame in extended position.

Fig. 15 is a longitudinal vertical section of a slightly modified form of the machine.

Fig. 16 is a perspective view of an accessory plate for use in plain slicing operations.

Fig. 17 is an enlarged detail view in vertical section through a modified form of cutter blade support.

Fig. 18 is a bottom plan view of a blade adjusting strip.

Fig. 19 is a top plan view of the blade shown in Figs. 15 and 17.

Referring to the drawings, 20 designates each of a pair of parallel longitudinal bars constituting side frame members and formed with outwardly extending horizontal flanges 21 on their upper edges that constitute slideways for a reciprocating food carrier. Fitted between the forward portion of the frame bars 20 is a plate 22 having downwardly extending longitudinal flanges 23 that are riveted to and brace the frame bars 20, as shown at 24. Pivoted at 25 (Fig. 1) in the frame bars 20 are foldable supporting legs 26, each of said legs, as best shown in Fig. 1, preferably being made from a length of heavy wire bent to the substantially U-shape shown in Figs. 1 and 2, these legs being formed with upwardly bowed portions 26' (Fig. 2) inwardly of their pivoted ends that, through contact with plates 22 and 31, limit the outward swing of the legs, when the latter are extended to working position. The collapsed position of the legs is illustrated by dotted lines in Fig. 2.

The inner end edge of the plate 22 is oblique, as shown in Fig. 3, and soldered or otherwise secured to the under side thereof is a hollow strip 27 (Fig. 5) that forms a mounting for an oblique slicing blade 28, the cutting edge of which projects slightly beyond the inner edge of the plate 22. The blade 28 is removably attached to its support 27 by screws 29, and the rear edge of the blade abuts against depending lugs 30 cut and bent downwardly from the support 27. This construction provides a readily removable blade which can be taken off and resharpened when required, without disassembling any of the other parts of the device.

Facing the blade 28 is an adjustable support for the article to be sliced, comprising in the instance shown in Figs. 1 and 2, a plate 31 structurally similar to the plate 22 and having depending flanges 32 on its longitudinal edges that fit between and brace the frame bars 20. The flanges 32 are pivotally connected at their rear ends to the frame bars 20 by rivets 24', and they are formed with holes 33 for the passage of the hinge pintles of the legs 26, these holes being somewhat larger than the pintles, to permit a slight swinging movement of the support 31, by which the thickness of the slices is varied as desired. This adjustment of the support 31 may be effected by any suitable or convenient means, but in the drawings I have shown for this purpose a pair of cams in the form of eccentrics 34 fast on a transverse shaft 35 mounted in and extending between the frame bars 20 (Fig. 4) said cams operating in a pair of oblong slots 36 in the flanges 32. To give the cams a better bearing, the slots are formed with inwardly pressed marginal walls 36'. The shaft 35 is formed at one end with an operating handle 37, and the cams 34 are locked thereon between the frame bars 20 and upset lugs 38 on the shaft. The other end of the shaft is threaded to receive a lock nut 39 and washer 40, by which, when the shaft has been turned to suitably raise or lower the inner end of the support 31 relatively to the blade 28, it can be locked against turning movement by turning up the nut 39. The inner edge of the support 31 is, of course, made oblique to match the oblique edge of the blade 28, and for stiffening purposes said free end is folded downwardly and inwardly, as shown at 41.

Reciprocable over the top surface of the slicer is a bottomless carrier for the articles to be cut, comprising in the instance shown, a rectangular frame formed with side walls 42 and a rear wall 43, the side walls being connected at their forward end by a tie rod 44 that also constitutes a hinge pintle for a lid or follower plate 45 that fits loosely within the side and rear walls of the carrier. To the rear portion of this follower is rigidly attached a handle 46 by which it may be raised or lowered and by which the carrier may be reciprocated, and the ends of said handle project over the upper edges of the side walls 42 thus forming, with the latter, stops to limit the downward movement of the follower plate 45 to a point at which it will not strike the edge of the blade 28. In the form shown in Figs. 1 and 2, oblique rearwardly inclined teeth 47 are cut and pressed downwardly from the follower plate 45, said teeth as shown in Fig. 2 serving to bite into and carry along the article to be cut when the carrier is moved rearwardly, the said article being advanced over the cutter on the forward movement of the carrier by the thrust of the rear wall 43 thereagainst. The side walls 42 of the carrier are formed on their lower edges with channel slides 48 which engage with the slideways 21, as clearly shown in Fig. 1.

In the use of the utensil as thus far described, the supporting legs 26 are extended to working position in which the portions 26' thereof engage with the under sides of the plates 22 and 31 and thus effectively support the structure. The nut 39 is then backed off sufficiently to permit turning of the cam shaft 35, and by the latter and the cams 34 the free inner edge of the support 31 is adjusted relatively to the opposed edge of the blade to effect the desired thickness of cut, and the nut is then turned up. The hinged follower 45 is then swung upwardly and outwardly, and the article to be sliced, such as a potato, is placed within the frame, and the follower plate is then lowered onto the article. By the handle 46, the carrier is then reciprocated until the slicing of the article is complete, the slices dropping into a suitable plate or pan placed beneath the frame.

In Fig. 6 I have illustrated a substitute for the clamp nut 39 on the shaft 35, consisting of a spring disc 49 on the outer projecting end of the shaft having frictional engagement with the outer side of the frame bar 20 sufficient to lock the cam shaft 35 against turning under the down thrust on the support 31 during the slicing operation. The shaft 35 may however, be readily turned by its handle 37 when adjusting the support 31 to give a thicker or thinner slicing.

The structural features of the slicer thus far described have been so designed as to render practical the use of auxiliary devices for effecting variations in the shapes and sizes of the cut product without involving any rearrangement or disassembling of the parts of the slicer, and by the mere addition of readily applied and removed auxiliary members for effecting these variations. For instance, in Figs. 8, 10 and 11 I have illustrated a shredder, designed to produce, for example, "shoe string" potatoes. This consists of a plate 50 having formed therein several transverse rows of upwardly struck cutters 51, the cutters in each row being staggered relatively to those of an adjacent row, as best shown in Fig. 10. The plate 50 is formed with depending tapered side flanges 52 which, when the support 31 is lowered as shown in Fig. 11, will fit snugly between the frame bars 20, with the plate 50 occupying substantially the plane occupied by the support 31 when the latter is fully elevated. To prevent endwise movement of the shredder plate 50 during the shredding operation, its rear end is formed with a transverse hook 53 that hooks over an upstanding transverse rib 54 on the support 31, and at its other end the plate 50 has an extension 55 that, as shown in Figs. 10 and 11, overlaps and occludes the cutting edge of the blade 28. To lock the plate 50 against possible upward displacement during the shredding operation, said extension 55 is formed with one or more downwardly inclined tongues 56 cut from extension 55 that enter beneath the cutting edge of the blade. Downwardly pressed bosses 50' on plate 50 rest on plate 31 and aid in maintaining plate 50 flat under pressure.

In Fig. 9 I have illustrated fragmentarily an auxiliary plate 57 structurally similar in all respects to the shredder plate 50 except that it is provided with transverse rows of upwardly punched teeth 58 designed to effect a grating action on the article subjected to its action.

To render the utensil capable of producing potatoes in the "French fried" form, I have provided two attachments, either of which may be used with good results. In Fig. 7 I show a stripper plate 59 which omits the flanges 52 and the extension 55 of the shredder and grater plates previously described, and is designed to lie flat on the support 31 in a lowered position of the latter. At its inner end the plate 59 has a row of upwardly struck vertical cutters 60 suitably spaced to give a correct width to the strips, and on the inner end of the plate 59 is a depending oblique flange 61 that overlaps the inner end edge of the plate 31, preventing rearward displacement of the plate 59 when the carriage is drawn rearwardly. The cutters 60 lie slightly in advance of the cutting edge of the blade 28 and manifestly cooperate with the latter in producing the transversely rectangular strips commonly known as "French fried". In Figs. 12 and 13 I illustrate another accessory designed to also produce a cut product of the same character as that last described. This consists of a block 62 formed with a plurality of transverse vertical slots 63 designed to accommodate circular cutter discs 64 loosely mounted to turn freely on a shaft 65. The block 62 may be attached to the frame with the cutter discs underlying the blade 28, a simple means for this purpose consisting of transverse end slots 66 by which the ends of the block may be entered over the bars 20 and flanges 23 from beneath, and readily removable locking pins 67 passed through holes 68 provided in the members 20 and 23. As shown in Fig. 12, the peripheries of the cutter discs 64 just clear the lower side of the blade 28, so that the cutters 64 act on the slice to sub-divide it while the slice itself is being severed.

In Figs. 2 and 14 I illustrate a simple device for maintaining the legs 26 yieldably locked in extended position, to prevent accidental collapse while using the utensil. As the legs are folded and unfolded, their side limbs snap past the inner heads of the rivets 24, 24', the side limbs of the legs springing slightly inward to permit such movement. When the leg is fully extended, the side limbs spring outwardly, so that the inner head of the rivet manifestly functions as a yieldable lock to hold the legs in fully extended position.

In Figs. 15 to 19 inclusive I illustrate a slightly modified form of the invention, which in most of its details embodies the structural features of the form previously described. By reference to Fig. 15 it will be observed that the longitudinal side members 20 of the frame extend rearwardly of the rear legs 26, as shown at 20', and support between them a stout wooden handle 70 mounted on a cross pin 71. When effecting the slicing, grating or shredding operations by forward movement of the carrier, a considerable forward pull is exerted on the frame, and the handle 70 provides an effective means for resisting such pull when grasped by one hand of the operator.

In this embodiment of the invention, I have also reversed the relations of the slicer and grater plates, making the grater plate 57' a permanent element of the machine, and making the plain flat slicer plate 31' (Fig. 16) an accessory device which, when the slicing operation is called for, is superposed upon the previously lowered grater plate 57', the plate 31' being provided at its inner end with a depending flange 72, which overhangs the free inner edge of the grater plate 57', and prevents backward sliding of the plate 31' when the loaded carriage is being returned over the latter. I have also included in this modification of the invention, a slightly different blade mounting, as follows. The inner end portion of the plate 22 is formed with a row of integral depressed lugs 73, functionally similar to the hollow strip 27 of Figs. 2 and 5. Across these lugs is laid a flat metal blade-adjusting strip 74 (Fig. 18) formed with a group of oblique cam slots 75 and a depending stop flange 76 on one longitudinal edge. The plate 22, between adjacent lugs 73, is formed with downwardly struck and internally tapped short sleeves 77 (Fig. 17). The cutter blade 78 is formed with a group of notches 79 in its rear edge, and this blade underlies the strip 74, with its rear longitudinal edge abutting against the flange 76. The blade and adjusting strip are securely clamped on the lugs 73 by short screws 80, the latter passing through the notches 79 and the cam slots 75. To adjust the blade 78 forwardly or rearwardly, the screws 80 are retracted sufficiently to release the clamping pressure, and by a screw driver or other suitable tool, the adjusting strip 74 is shifted endwise. When shifted in one direction, it moves bodily toward the inner end of plate 22, carrying the blade 78 with it by reason of the contact of flange 76 with the rear edge of the blade. When shifted in the reverse direction, it moves toward the outer end of the plate 22 away from the blade, and the latter can then readily be shifted by the fingers into contact with flange 76, and the screws retightened. This provides a simple and easily manipulated blade mounting for adjusting the cutting edge of the blade to just the desired height.

In this form of the invention I have also illustrated a slightly modified form of lid or follower plate 45', wherein, instead of providing on the under side thereof oblique teeth, such as the teeth 47 shown in Fig. 2, I simply punch a series of holes through the follower plate from above, the metal extruded by the punch at each hole forming an annular group of depending teeth 81 which readily bite into the article to be sliced, grated or shredded.

Since nearly all of the parts of the utensil are sheet metal stampings, it is manifest that the device combines practical economy of manufacture, with a wide variety of uses. It is also very simple to operate and to clean, for which latter purpose I preferably give to the cams 34 a throw that will, in the highest positions of the cams, cause the free end of the plate 31 or 57' to lie slightly above the edge of the blade, thereby avoiding danger of cutting the fingers on the blade when washing the device.

I have herein shown and described, for purposes of illustrating the invention, several practical embodiments thereof which have been found to satisfactorily effectuate the stated purposes and objects of the invention, but it is manifest that the structural details may be considerably varied without involving any departure from the principle of the invention or sacrificing any of the advantages thereof, and hence I do not limit the invention to the specific form shown, but reserve all such variations, modifications and mechanical equivalents as fall within the spirit and purview of the appended claims.

I claim as my invention:

1. In a food comminuting utensil, the combination of a frame having parallel side bars, a blade mounted on said frame, a sheet metal support formed with depending side flanges fitted between and at their rear ends pivoted to said side bars, and having a free end thereof facing said blade, said flanges formed with oblong slots forwardly of their pivots having laterally extended marginal walls, a transverse shaft underlying said support and extending through said slots and journaled in said side bars, eccentrics on said shaft engaged with said marginal walls, and means for locking said shaft against turning under a down thrust on said support.

2. In a food comminuting utensil, the combination of a frame having parallel side bars, a blade mounted on said frame, a sheet metal supporting plate formed with depending side flanges fitted between and at their rear ends pivoted to said side bars, and having a free end thereof facing said blade, means for raising and lowering the free end of said supporting plate, and legs for said frame located beneath said supporting plate, said legs at their upper ends having lateral extensions mounted in said frame side bars, and said flanges having holes through which said leg extensions pass, said holes being larger in diameter than said leg extensions whereby to permit angular movement of said supporting plate.

3. In an inter-changeable food slicer and shredder, the combination of a frame, a blade mounted thereon, a smooth plate facing said blade, a removable shredder plate of a length to overlie said smooth plate and the cutting edge portion of said blade, means for locking said shredder plate against endwise movement, and a bottomless food carrier slidable over said plates.

4. In an inter-changeable food slicer and shredder, the combination of a frame, a blade mounted thereon, a smooth plate facing said blade, a removable shredder plate of a length to overlie said smooth plate and the cutting edge portion of said blade, one or more tongues on the forward end of said shredder plate adapted to underlie the cutting edge portion of said blade, and a bottomless food carrier slidable over said plates.

5. In an inter-changeable food slicer and shredder, the combination of a frame, a blade mounted thereon, a smooth plate facing said blade, said plate formed with a transverse rib on its rear end, a removable shredder plate of a length to overlie said smooth plate and the cutting edge portion of said blade, said shredder plate formed with a hook on its rear end adapted to engage with said transverse rib and one or more tongues on its forward end adapted to underlie the cutting edge portion of said blade, and a bottomless food carrier slidable over said plates.

6. In an inter-changeable food slicer and stripper, the combination of a frame, a blade mounted thereon, a vertically adjustable smooth plate facing said blade, a removable stripper plate carrying parallel vertical cutters adapted to overlie said smooth plate in front of said blade, means for locking said stripper plate against endwise movement, and a food carrier slidable over said plates and blade.

7. In an inter-changeable food slicer and stripper, the combination of a frame, a blade mounted thereon, a vertically adjustable smooth plate facing said blade, said plate formed with a transverse rib on its rear end, a removable stripper plate carrying parallel vertical cutters adapted to overlie said smooth plate in front of said blade, said stripper plate formed with a hook on its rear end adapted to engage with said transverse rib and with a depending flange on its forward end adapted to overhang the forward end of said smooth plate, and a food carrier slidable over said plates and blade.

8. In an inter-changeable food slicer and grater, the combination of a frame having parallel side bars, a blade mounted thereon, a plate hinged at its rear end to and between the side bars of said frame, means for adjusting the forward end of said plate vertically relatively to said blade, a removable plate adapted to overlie said first-named plate, one of said plates having a smooth top surface and the other a grater top surface, means for locking said removable plate against endwise movement, and a food carrier slidable lengthwise of said frame.

9. In a food slicer, the combination of a frame, a bed plate thereon, blade mounting lugs on the under side of said bed at one end of the latter, an obliquely slotted blade-adjusting strip overlying said lugs, said strip having on its rear edge a depending stop flange, a transversely slotted blade overlying said adjustment strip with its rear edge abutting against said flange, and fastening screws passed through the slots of said blade and adjustment strip into said bed plate.

10. In an inter-changeable food slicer and shredder, the combination of a frame, a blade mounted thereon, a smooth plate facing said blade, a removable shredder plate of a length to overlie said smooth plate and the cutting edge portion of said blade, said shredder plate formed with one or more bosses on its under side adapted to rest on said smooth plate and with one or more tongues on its forward end adapted to underlie the cutting edge portion of said blade, and a bottomless food carrier slidable over said plates.

11. In a food comminuting utensil, the combination of a frame including longitudinal side bars, front and rear inwardly foldable legs pivotally mounted in said side bars, a cutting blade mounted in said frame, a bottomless food carrier slidably mounted on said frame, a toothed follower plate pivotally mounted in said carrier, a handle on said follower plate by which the latter may be raised and lowered and by which said carrier may be reciprocated over said frame, longitudinal extensions of said side bars extending rearwardly of said rear legs, and a handle mounted in and between said side bar extensions for holding said frame steady during the reciprocating movements of said carrier.

BERTRAM T. PHILLIPS.